United States Patent [19]

Yokota et al.

[11] Patent Number: 4,846,867
[45] Date of Patent: Jul. 11, 1989

[54] METHOD FOR PRODUCING GLASS PREFORM FOR OPTICAL FIBER

[75] Inventors: Hiroshi Yokota; Hiroo Kanamori; Yoichi Ishiguro; Futoshi Mizutani; Gotaro Tanaka, all of Yokohama, Japan

[73] Assignee: Sumitomo Electric Industries, Ltd., Japan

[21] Appl. No.: 170,082

[22] Filed: Mar. 11, 1988

Related U.S. Application Data

[63] Continuation of Ser. No. 853,137, Apr. 17, 1986, abandoned.

[30] Foreign Application Priority Data

Apr. 18, 1985 [JP]  Japan ................................. 60-83243

[51] Int. Cl.$^4$ ........................................... C03B 37/018
[52] U.S. Cl. ..................... 65/3.12; 65/18.2; 65/DIG. 16
[58] Field of Search .............. 65/3.12, 3.11, 3.1, 65/18.2, 3.15, DIG. 16, 900; 427/163, 167

[56] References Cited

U.S. PATENT DOCUMENTS

| | | | |
|---|---|---|---|
| 3,932,162 | 1/1976 | Blankenship | 65/3.12 |
| 4,235,615 | 11/1980 | Rau | 65/DIG. 16 |
| 4,257,797 | 3/1981 | Andrejco | 65/3.12 |
| 4,579,571 | 4/1986 | Hicks | 65/3.12 |
| 4,586,943 | 5/1986 | Kyoto | 65/3.12 |
| 4,599,098 | 7/1986 | Sarkar | 65/3.12 |

FOREIGN PATENT DOCUMENTS

| | | |
|---|---|---|
| 0125828 | 11/1984 | European Pat. Off. . |
| 2394501 | 1/1979 | France . |
| 2395232 | 1/1979 | France . |
| 2417478 | 9/1979 | France . |
| 2441594 | 6/1980 | France . |
| 56-84328 | 7/1981 | Japan .................. 65/DIG. 16 |
| 1558550 | 1/1980 | United Kingdom . |

OTHER PUBLICATIONS

Electronics Letters 7-17-86, vol. 22, No. 15, 791-792, Iwashita and Matsumoto.
Sumitomo Electric Technical Review, No. 26, 1-1987, 43-53, Tanaka et al.
Conference on Optical Fiber Communication; Jan. 23-25, 1984, New Orleans, La.; pp. 54-55.

Primary Examiner—Kenneth M. Schor
Attorney, Agent, or Firm—Cushman, Darby & Cushman

[57] ABSTRACT

A method for producing a glass preform for use in the fabrication of an optical fiber which comprises inserting a core rod made of quartz glass in a cladding tube made of quartz glass added with fluorine, heating them from the outside of the cladding tube to fuse them together to form a primary glass preform comprising a core rod and a first cladding layer around the core rod, depositing SiO$_2$ soot particles around the primary glass preform and thermally treating the soot deposited glass preform in the presence of a fluorine-containing compound to form a final glass preform from which an optical fiber is fabricated. From the glass preform produced by this method, an optical fiber having low attenuation of light transmission in a wide range of wave-length is fabricated.

4 Claims, 2 Drawing Sheets

METHOD FOR PRODUCING GLASS PREFORM FOR OPTICAL FIBER

This is a continuation of application Ser. No. 853,137, filed Apr. 17, 1986, which was abandoned upon the filing hereof.

FIELD OF THE INVENTION

The present invention relates to a method for producing a glass preform for use in the fabrication of a single mode optical fiber having good light transmission characteristics. More particularly, it relates to a method for producing a glass preform for use in the fabrication of a single mode optical fiber comprising a core made of pure quartz glass and a cladding made of quartz glass added with fluorine.

BACKGROUND OF THE INVENTION

A single mode optical fiber comprising a core made of pure quartz glass and a cladding made of fluorine added quartz glass theoretically has small attenuation of light transmission since the core does not contain any additive which causes scattering loss. Since pure quartz glass has less stuctural defects, it has good resistance to irradiation, which varies with the amount of the defects. Therefore, once such optical fiber is fabricated, it can be used as a reliable optical fiber suitable for telecommunication with a large capacity. However, such optical fiber is difficult to produce. For example, when it is produced by a known modified chemical vapor deposition (MCVD) method, it is difficult to increase a synthesizing rate of the cladding made of the fluorine added quartz glass, which means poor productivity of the optical fiber. By a vapor phase axial deposition (VAD) method, it is difficult to form a refractive index distribution by the addition of fluorine.

As one of methods for producing a glass preform for use in the fabrication of an optical fiber, a so-called rod-in-collapse method is known. The rod-in-collapse method comprises inserting, as a core material, a glass rod having a higher refractive index in a quartz glass tube having a lower refractive index than that of the core material and heating and fusing them together, namely collapsing them to form a glass preform. However, by the rod-in-collapse method, it is difficult to reduce the attenuation of light transmission while it is easy to form a refractive index distribution.

As the results of the study of the present inventors, followings have been found:

For the production of a glass preform from which a single mode optical fiber having a larger ratio of a cladding diameter to a core diameter, it is difficult to form a cladding layer with a desired thickness in a single step by the rod-in-collapse method. That is, when the core rod has a small outer diameter, it is easily deformed in the collapsing step so that the core portion of the resulting glass preform tends to be eccentric. When the core rod has a large outer diameter, the wall thickness of the quartz tube should be made large. Therefore, it is rather difficult to collapse them.

It is proposed to collapse a plural of tubes made of quartz glass added with fluorine successively around the core rod made of pure quartz glass. By this method, eccentricity of the core is suppressed or prevented and all the cladding layers can be formed with good thermal efficiency. When an optical fiber is fabricated from the glass preform produced by this method, absorption loss of the optical fiber due to, for example, residual hydroxyl groups can be decreased by suitable treatment of the preform before or during collapsing. However, it is found that the optical fiber still has some attenuation of light transmission which is independent on a wavelength. Further, in the above method, since the several collapsing steps are required, a large amount of materials is wasted so that the productivity of the final optical fiber is not sufficient.

SUMMARY OF THE INVENTION

One object of the present invention is to provide a method for producing a glass preform for use in the fabrication of a single mode optical fiber having good light transmission characteristics by a rod-in-collapse method.

Another object of the present invention is to provide a method for producing a glass preform for use in the fabrication of an optical fiber having low attenuation of light transmission in a wide range of wavelength.

Further object of the present invention is to provide a method for producing a glass preform for use in the fabrication of an optical fiber by which the cladding tube is easily collapsed so that eccentricity of the core rod is suppressed or prevented.

These and other objects are accomplished by a method of the present invention, which comprises inserting a core rod made of quartz glass in a cladding tube made of quartz glass added with fluorine, heating them from the outside of the cladding tube to collapse and fuse them together to form a primary glass preform comprising a core rod and a first cladding layer around the core rod, depositing $SiO_2$ soot particles around the primary glass preform and thermally treating the soot deposited glass preform in the presence of a fluorine-containing compound to form a final glass preform from which an optical fiber is fabricated.

DETAILED DESCRIPTION OF THE INVENTION

In the method of the present invention, firstly, the primary glass preform having a comparatively small ratio of the cladding diameter and the core diameter is produced by inserting the core rod in the glass tube made of quartz glass added with fluorine (hereinafter referred to as "glass tube") and collapsing the glass tube onto the core rod.

The core rod is preferably made of a highly pure glass material containing few of no residual hydroxyl group. Such core rod can be prepared by the conventional VAD method.

The glass tube is also preferably made of a highly pure glass material containing few or no residual hydroxyl group. Such glass tube can be prepared by forming a soot preform of pure $SiO_2$ particles by the conventional VAD method, dehydrating it in an atmosphere containing a chlorine-containing compound, adding fluorine to it with a fluorine-containing compound (e.g. $SF_6$, $CF_4$ and $SiF_4$), vitrifying the soot preform to produce a transparent glass rod and boring it to form a glass tube.

The composite of the cladding glass tube and the core rod inserted in the tube is then heated and collapsed at a temperature higher than a flowing point of the glass, for example, a temperature of 1,400 to 1,800, preferably 1,500 to 1,700. In this step, preferably, the inner wall surface of the glass tube and the outer surface of the glass rod are cleaned, for example, by gas phase etching with a halogen-containing compound (e.g. $SiF_4$, $Cl_2$, $SF_6$, $SOCl_2$, $SiCl_4$ and the like).

Figure 1:
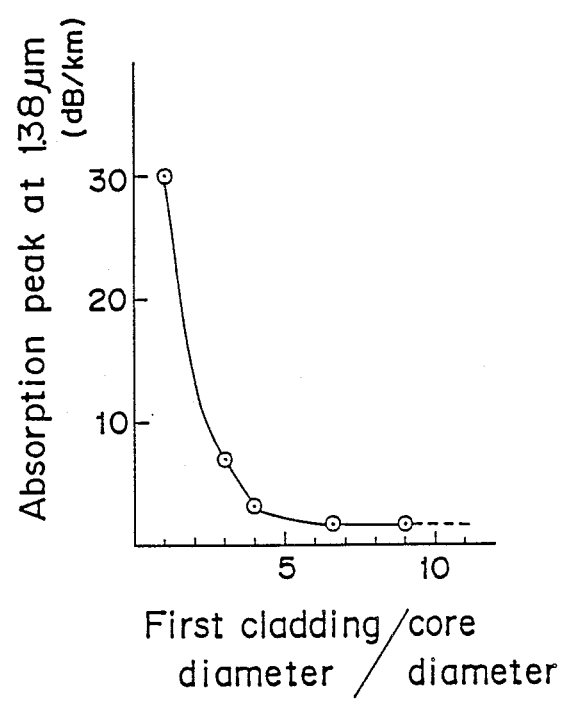
FIG. 1 shows a relationship between the absorption peak at a wavelength of 1.38 $\mu$m and the cladding diameter/core diameter ratio of the primary glass preform.

Preferably, the primary glass preform produced by the above steps has a first cladding diameter/core diameter ratio of 3 to 7. When the ratio is large, the interfacial condition between the first and second claddings has less influence on the attenuation characteristics of the fabricated optical fiber, but collapsing of the composite is difficult. FIG. 1 shows the relationship between absorption peak of the optical fiber at a wavelength of 1.38 $\mu$m and the ratio of the first cladding diameter and the core diameter.

In the next step, around the primary glass preform, soot particles of $SiO_2$ are deposited.

Usually, the outer diameter of the primary glass preform is 10 to 20 mm. When it is too small, the primary glass preform is deformed by shrinking force of the layer of the deposited $SiO_2$ particles during the subsequent heating step. When the outer diameter of the primary glass preform is too large, the layer of the deposited $SiO_2$ particles should be made large but the thicker layer tends to cause cracking of the layer. The $SiO_2$ particles are produced by flame oxidation of a glass-forming raw material (e.g. $SiCl_4$, $SiBr_4$, $SiF_4$ and the like) with, for example, oxyhydrogen flame or natural gas flame and deposited in a semi-sintered state on the surface of the primary glass preform.

In the subsequent heating step, the preform having the layer of the $SiO_2$ particles is heated in an atmosphere comprising the fluorine-containing compound (e.g. $SF_6$, $CF_4$ and $SiF_4$) at a temperature of 1,000° to 1,700° C., preferably 1,300° to 1,600° C. Heating of the glass preform may be carried out by gradually inserting it in a furnace kept at a desired elevated temperature or placing it in a furnace kept at a low temperature and gradually raising the temperature of the furnace. Fluorine is added in such an amount that the refractive indexes of the first and second cladding are substantially the same. For example, the difference of the refractive indexes between the first and second cladding is 0.05% or less. If the difference of the refractive indexes is larger than this limit, the fabricated optical fiber has some increased long wavelength loss or unstable cut off value.

Practical and presently preferred embodiments of the present invention are shown in the following examples.

EXAMPLE 1

A highly pure quartz glass synthesized by the VAD method was drawn at 2,000° C. to form a rod having an outer diameter of 3 mm and a length of 50 cm.

A pure $SiO_2$ glass soot rod was produce by the VAD method and then heated by gradually introducing it in a furnace in three steps under following conditions to produce a fluorine-added glass rod of 50 mm in outer diameter and 300 mm in length having a refractive index 3% lower than that of quartz glass:

|  | Temperature | Atmosphere |
| --- | --- | --- |
| Step 1: | 1,000 | $Cl_2$ 3%, He 97% |
| Step 2: | 1,350 | $SiF_4$ 3%, He 97% |
| Step 3: | 1,650 | $SiF_4$ 3%, He 97% |

Then, the rod was bored at its center and drawn to form a fluorine-added quartz tube of 20 mm in outer diameter and 4 mm in inner diameter.

The pure quartz rod was inserted in the fluorine-added quartz glass tube and then heated and collapsed with introducing a gaseous mixture of $SiF_4$, $Cl_2$ and oxygen (ratio = 1:1:6 by volume) through a gap between the rod and the tube to form the primary glass preform having an outer diameter of 19 mm and a first cladding diameter/core diameter ratio of 6.6. The primary preform was drawn to an outer diameter of 14 mm.

On the outer surface of the drawn primary preform, $SiO_2$ soot particles were deposited to an outer diameter of 120 mm. The soot particles were synthesized by introducing $SiCl_4$ in an oxyhydrogen flame. The preform having the deposited particles was placed in a furnace kept at 800° C. and heated to 1,500° C. at a rate of 3.3° C./min. with introducing helium gas and $SiF_4$ gas at rates of 15 l/min. and 450 ml/min., respectively.

The produced glass preform was drawn to fabricate a single mode optical fiber having an outer diameter of 125 $\mu$m. The optical fiber had a core diameter of 8.3 $\mu$m, and a difference of specific refractive indexes of the cladding and the core of 0.3%. Its attenuation of light transmission at a wavelength of 1.3 $\mu$m was 0.35 dB/km and absorption peak at a wavelength of 1.38 $\mu$m due to the hydroxyl groups was 1.5 dB/km.

Figure 2:
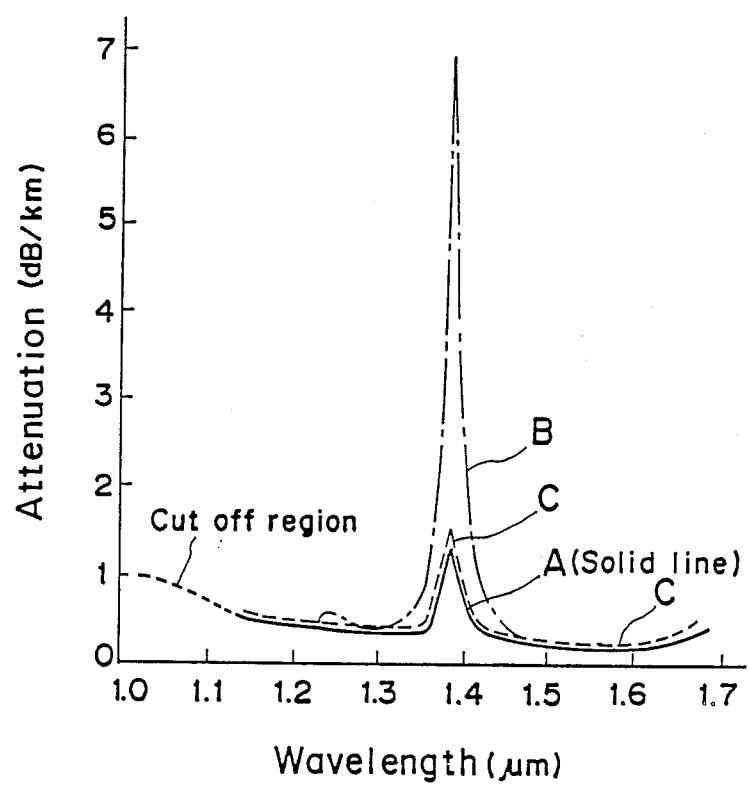
FIG. 2 shows attenuation characteristics of the optical fibers produced in Example 1 (Curve A), Example 2 (Curve B) and Comparative Example 1 (Curve C).

Its attenuation characteristics is shown in FIG. 2, Curve A.

EXAMPLE 2

In the same manner as in Example 1 except that the first cladding diameter/core diameter ratio was 3, a single mode optical fiber was fabricated. Its attenuation of light transmission at a wavelength of 1.3 and 1.38 $\mu$m was 0.45 and 7 dB/km, respectively. Its attenuation characteristics is shown in FIG. 2, Curve B.

COMPARATIVE EXAMPLE 1

The primary glass preform produced in the same manner as in Example 1 was covered with a glass tube made of a quartz glass added with fluorine and collapsed to form a second cladding. From the thus produced preform, a single mode optical fiber having substantially the same cross sectional structure as that of the optical fiber fabricated in Example 1 was fabricated. Its attenuation of light trasmission at a wavelength of 1.3 and 1.38 $\mu$m was 0.52 and 1.6 dB/km, respectively. Although it contained less residual hydroxyl groups, attenuation was increased by about 0.1 dB/km or more in a wide range of wavelength. Its attenuation characteristics is shown in FIG. 2, Curve C.

COMPARATIVE EXAMPLE 2

Around the same glass rod having an outer diameter of 7 mm produced in the same manner as in Example 1, soot particles of $SiO_2$ was deposited in the same manner as in Example 1 to an outer diameter of 80 mm. Then, the glass rod having the layer of the deposited soot particles was heated in an atmosphere comprising helium gas and a fluorine-containing compound ($SiF_4$) to form a primary glass preform having a cladding diameter/core diameter ratio of 5.

The primary preform was drawn to an outer diameter of 7 mm and, then, soot particles of $SiO_2$ were deposited around it to form a second cladding in the same manner as in Example 1. From the preform, an optical fiber having substantially the same cross sectional structure as that of the optical fiber as fabricated in Example 1 was fabricated. Its attenuation of light transmission at a wavelength of 1.3 and 1.38 μm was 1.4 and 30 dB/km, respectively. The means that the optical fiber had large absorption peak due to the hydroxyl group, which might be formed by the contact of the oxyhydrogen flame with the core rod.

From the glass preform produced by the method of the present invention, an optical fiber having extremely low attenuation of light transmission in a wide range of wavelength is fabricated.

Since the first cladding can be made thin, heat efficiency in the collapsing step is improved.

As the primary glass preform is used as a rod member on which the soot particles of the second cladding is deposited, any glass tube previously synthesized is not used as the second cladding. Therefore, such processes as cleaning of the inner surface of the glass tube or collapsing of the tube is not necessary, this resulting in high productivity of the glass preform.

Since the second cladding can be formed after the primary glass preform is drawn, the primary glass preform may have a larger size and a smaller cladding diameter/core diameter ratio so that the collapsing of the cladding is easily carried out, and eccentricity of the core is prevented. Therefore, the fabrication of inferior optical fibers is suppressed and, in turn, the productivity of the optical fiber is increased.

What is claimed is:

1. A method for producing a glass preform for use in the fabrication of a single mode optical fiber, comprising the steps of:

inserting a core rod made of quartz glass in a cladding tube made of fluorine-containing quartz glass, heating the core rod and the cladding tube from the outside of the cladding tube while etching an inner wall surface of the cladding tube and an outer surface of the rod by a halogen-containing compound gas to heat-collapse the cladding tube onto the core rod and fusing the core rod and cladding tube together to form a primary glass preform comprising a core rod and a first cladding layer around the core rod with a cladding diameter/core diameter ratio of 3 to 7, producing $SiO_2$ soot particles by flame oxidation of a glass-forming raw material and depositing said $SiO_2$ soot particles in a semisintered state around the primary glass preform to form a second cladding and adding fluorine to the deposited $SiO_2$ soot in such an amount that the difference between the refractive indexes of the first and second cladding after the second cladding has been vitrified is less than 0.05%, said adding fluorine being effected by thermally treating the soot deposited glass preform in the presence of a fluorine-containing gas compound at a temperature of 1000° to 1,700° C. and vitrifying said soot by heating to form a final glass preform from which an optical fiber is fabricated.

2. The method according to claim 1, wherein the core rod is one made by the VAD method.

3. The method according to claim 1, wherein the fused core rod and cladding tube are drawn before the $SiO_2$ soot particles are deposited.

4. The method according to claim 1, wherein the $SiO_2$ particles are synthesized by flame hydrolysis of $SiCl_4$.

* * * * *